(12) United States Patent
Kaneko et al.

(10) Patent No.: US 9,038,759 B2
(45) Date of Patent: May 26, 2015

(54) HYBRID WORK VEHICLE

(75) Inventors: Satoru Kaneko, Naka (JP); Takashi Ikimi, Hitachi (JP); Hidekazu Moriki, Hitachinaka (JP); Noritaka Ito, Ushiku (JP); Hiroaki Yanagimoto, Kasumigaura (JP); Toru Kikuchi, Inashiki (JP); Toshio Kotaka, Ryugasaki (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 8 days.

(21) Appl. No.: 13/817,593

(22) PCT Filed: Aug. 19, 2011

(86) PCT No.: PCT/JP2011/068786
§ 371 (c)(1),
(2), (4) Date: Feb. 19, 2013

(87) PCT Pub. No.: WO2012/035928
PCT Pub. Date: Mar. 22, 2012

(65) Prior Publication Data
US 2013/0149093 A1 Jun. 13, 2013

(30) Foreign Application Priority Data
Sep. 17, 2010 (JP) ................................. 2010-209449

(51) Int. Cl.
*B60K 6/52* (2007.10)
*E02F 3/36* (2006.01)
(Continued)

(52) U.S. Cl.
CPC ... *E02F 3/36* (2013.01); *B60K 1/02* (2013.01); *B60K 6/46* (2013.01); *B60K 17/043* (2013.01);
(Continued)

(58) Field of Classification Search
CPC ..... E02F 9/0858; E02F 9/0841; E02F 9/2075; E02F 9/2087; E02F 3/36; B60K 17/043; B60K 17/356; B60K 6/46; B60K 1/02; B60W 2300/17; B60W 2300/50; B60Y 2200/415; Y02T 10/6217; Y02T 10/6265; Y10S 903/902; B62D 53/026

USPC ............... 180/65.22, 65.245, 65.265, 65.285, 180/235, 14.2–14.4; 280/400; 172/3
See application file for complete search history.

(56) References Cited

U.S. PATENT DOCUMENTS 2,600,897 A * 6/1952 Mathias ........................ 180/14.3
3,334,702 A * 8/1967 Granryd ........................ 180/243
(Continued)

FOREIGN PATENT DOCUMENTS

JP  58-071223   4/1983
JP  05-130711   5/1993
(Continued)

OTHER PUBLICATIONS

JP Office Action of Appln. No. 2013-140580 dated Jun. 3, 2014 with English translation.

*Primary Examiner* — J. Allen Shriver, II
*Assistant Examiner* — Steve Clemmons
(74) *Attorney, Agent, or Firm* — Baker Botts L.L.P.

(57) ABSTRACT

[Problem] To provide a hybrid work vehicle which is simple in configuration, good in ease of mounting on a vehicle and capable of efficiently transmitting motive power.
[Solution] The hybrid work vehicle includes: an engine (1); a hydraulic pump (4) which is driven by the engine; a work device (5) which is disposed at the front of the vehicle and performs work using the hydraulic pump as a drive source; a motor/generator (6) which generates electric power by use of the torque of the engine; and a travel drive device which causes the vehicle to travel by rotating and driving wheels by use of the electric power generated by the motor/generator. The hybrid work vehicle is steered while the vehicle bends by way of a center joint (15). The travel drive device includes: a plurality of electric motors (21 and 22); and a propeller shaft (8) which is linked with the plurality of electric motors and transmits motive power from the plurality of electric motors to the wheels. The plurality of electric motors are disposed at the front and rear sides of the center joint with the center joint being disposed therebetween.

14 Claims, 9 Drawing Sheets

(51) Int. Cl.
  *B60K 6/46* (2007.10)
  *B60K 17/356* (2006.01)
  *E02F 9/08* (2006.01)
  *E02F 9/20* (2006.01)
  *B60K 1/02* (2006.01)
  *B60K 17/04* (2006.01)

(52) U.S. Cl.
  CPC .......... *B60K 17/356* (2013.01); *B60W 2300/17* (2013.01); *B60W 2300/50* (2013.01); *B60Y 2200/415* (2013.01); *E02F 9/0841* (2013.01); *E02F 9/2075* (2013.01); *E02F 9/2087* (2013.01); *Y02T 10/6217* (2013.01); *Y02T 10/6265* (2013.01); *Y10S 903/902* (2013.01); *E02F 9/0858* (2013.01)

(56) References Cited

U.S. PATENT DOCUMENTS

| | | | | |
|---|---|---|---|---|
| 5,586,613 | A * | 12/1996 | Ehsani | 180/65.23 |
| 6,479,906 | B2 * | 11/2002 | Uchida | 290/40 C |
| 6,705,030 | B2 * | 3/2004 | Tokunaga | 37/348 |
| 6,880,651 | B2 * | 4/2005 | Loh et al. | 180/14.2 |
| 7,379,797 | B2 * | 5/2008 | Nasr et al. | 701/22 |
| 2003/0116371 | A1 * | 6/2003 | Sakazaki | 180/65.6 |
| 2003/0205422 | A1 * | 11/2003 | Morrow et al. | 180/65.2 |
| 2005/0119806 | A1 * | 6/2005 | Nasr et al. | 701/22 |
| 2006/0042838 | A1 * | 3/2006 | Yeoman et al. | 180/6.2 |
| 2007/0080236 | A1 * | 4/2007 | Betz et al. | 237/12.1 |
| 2008/0223631 | A1 * | 9/2008 | Filla et al. | 180/65.1 |
| 2008/0264051 | A1 * | 10/2008 | Ericson et al. | 60/327 |
| 2009/0082945 | A1 * | 3/2009 | Kuras et al. | 701/105 |
| 2010/0048338 | A1 * | 2/2010 | Si | 475/5 |
| 2010/0268407 | A1 * | 10/2010 | Yanagisawa | 701/22 |
| 2010/0332061 | A1 * | 12/2010 | Forslow et al. | 701/22 |
| 2011/0048827 | A1 * | 3/2011 | Cherney et al. | 180/65.245 |
| 2011/0218075 | A1 * | 9/2011 | Frank et al. | 477/20 |
| 2012/0059537 | A1 * | 3/2012 | Hendrickson et al. | 701/22 |

FOREIGN PATENT DOCUMENTS

| | | | | |
|---|---|---|---|---|
| JP | 11-99838 | | 4/1999 | |
| JP | 2001103605 A | * | 4/2001 | B60L 11/02 |
| JP | 2002034105 A | * | 1/2002 | B60L 15/20 |
| JP | 2002-46494 | | 2/2002 | |
| JP | 2003-284208 | | 10/2003 | |
| JP | 2003-319510 | | 11/2003 | |
| JP | 2005133319 A | * | 5/2005 | E02F 9/20 |
| JP | 2006-205777 | | 8/2006 | |
| JP | 2008-263920 | | 11/2008 | |
| JP | 2009-241830 | | 10/2009 | |
| JP | 2010-30599 | | 2/2010 | |

* cited by examiner

HYBRID WORK VEHICLE

TECHNICAL FIELD

The present invention relates to a hybrid work vehicle. Particularly, it is suitable for an articulated hybrid work vehicle which is steered while the vehicle bends by way of a center joint.

BACKGROUND ART

In recent years, an energy saving trend on industrial products has been strong in view of environmental problem, rise of crude oil price, etc. The field of construction vehicles, work vehicles, etc. in which hydraulic drive systems using Diesel engines have heretofore played a central role is also on the same trend so that there has been an increasing number of instances using electrification to increase efficiency and improve energy saving.

When, for example, a drive portion of a vehicle in a construction machine etc. is electrified, that is, a power source thereof is set as an electric motor, lots of energy saving effects such as engine's high efficiency drive (hybrid), improvement in power transmission efficiency, recovery of regenerative electric power, etc. in addition to reduction of exhaust gas can be expected. Incidentally, in the aforementioned field of construction vehicles, work vehicles, etc., electrification of forklifts has been most advanced, and "electric-powered forklifts" in which motors are driven using electric power of batteries have taken the lead ahead of other vehicles and have been put into practical use. Consecutively to this, "hybrid vehicles" using combination of Diesel engines and electric motors in hydraulic excavators, engine type forklifts etc. have recently started being produced.

Among these construction machines and work vehicles on the trend toward ecology and energy saving using electrification, wheel loaders are vehicles which can be expected to have a comparatively large effect on reduction of fuel consumption when the vehicles are made hybrid. For example, as shown in FIG. 10, a background-art wheel loader is a work vehicle which has a travel portion (wheel portion) and a front hydraulic work portion (lift/bucket portion) so that while motive power of an engine 1 is transmitted to tires through a torque converter 2 and a transmission (T/M) 3 to make the vehicle travel, the bucket portion of the front hydraulic work device 5 using a hydraulic pump 4 as a drive source carries soil etc. In this manner, the wheel loader most frequently used currently uses only the engine as a power source and is driven to travel by the torque converter 2 and the transmission (T/M) 3 while the front hydraulic work portion is driven by the hydraulic pump 4.

When a travel drive portion of the aforementioned background-art wheel loader is electrified, transmission efficiency of the torque converter 2 and the transmission 3 can be improved up to transmission efficiency using electricity. Further, since the wheel loader repeats travel start and stop operations frequently during work, brake energy which has been heretofore emitted as heat loss of mechanical brake can be recovered and reused as regenerative electric power when the travel drive portion is electrified.

It is said that fuel consumption can be generally reduced by about a few tens of percent when part of the drive device of the current wheel loader is electrified and hybridized as described above. Some configurations are thought of for achievement of the hybridization. First, when vehicles including general cars are thought of, hybrid models are roughly classified into two types, i.e. a parallel hybrid type and a series hybrid type. Of them, the series hybrid type is a form in which a motive power transmission path between an engine and a motor is connected in series, that is, a generator is driven by motive power of the engine and an electric motor is driven by electric power generated by the generator. On the other hand, the parallel hybrid type is a form in which an engine and an electric storage device such as a battery or a large capacity capacitor are used together and motive power of the engine is mechanically assisted by motive power of an electric motor directly.

Various systems can be used as a system for transmitting the motive power of the engine assisted by the electric motor. For example, a system using combination of a torque converter and a transmission (T/M) or a system generally called HST using a hydraulic drive device can be used in the same manner as in the travel portion of the background-art wheel loader. In addition, a configuration in which a planetary gear and an electric motor are combined to perform electric gear change has also been recently proposed as a system which can most efficiently transmit the motive power of the engine mechanically. Thus, various system configurations have been conceived as the hybrid device. When a car or a construction machine is hybridized, it is necessary to prepare an optimal hybrid configuration in accordance with work/operation contents, device specifications, etc. of the car or construction machine.

In a work vehicle (a wheel loader, a dump truck, etc.) the invention is aimed at, an engine bears not only motive power required for travelling but also motive power requested by a front hydraulic work device and accounting for a comparatively large ratio. It is considered that, of those system configurations, in the aforementioned parallel hybrid system, an assist method using an electric motor may be comparatively complicated. It is therefore considered that the series hybrid type which is not so popular for general cars may be applied effectively.

A configuration example in the case where a general series hybrid system is applied to a wheel loader is shown in FIG. 11. The configuration example shown in FIG. 11 is a hybrid configuration in which a travel portion of a drive portion of the wheel loader is electrified and in which a motor/generator (M/G) 6 is mounted on an output shaft of an engine 1, an inverter 7 controls the motor/generator (M/G) 6, a drive motor 9 is attached to an output shaft (propeller shaft) 8 of the travel portion, and an inverter 10 controls the drive motor 9. An electric storage device 11 is electrically connected to the inverters 7 and 10 through a DC-DC converter 12 so that DC electric power can be supplied to and received from those electric power inverters. Particularly in the example of FIG. 11, the electric storage device 11 is described as an electric double layer capacitor. Buck-boost control of capacitor voltage is performed by the DC-DC converter 12 so as to receive/supply DC power from/to the inverters 7 and 10.

Similarly to the background-art wheel loader in FIG. 10, the hybrid wheel loader shown in FIG. 11 is also provided with a hydraulic pump 4 which supplies oil to a front hydraulic work device 5 for performing a work of excavating soil etc. in order to perform work in accordance with an object. On the other hand, the vehicle is driven to travel by the drive motor 9 using electric power generated by the motor/generator (M/G) 6 mainly based on motive power of the engine 1. Loss of a torque converter 2 is large in the background-art wheel loader in FIG. 10. However, when this portion is electrified as shown in FIG. 11, improvement in motive power transmission efficiency can be expected. During travelling, the electric storage device 11 can absorb regenerative electric power generated when the vehicle is braked, and assist power (torque) to the engine 1 to thereby contribute to reduction of the energy consumed by the vehicle.

When the wheel loader is the hybrid system shown in FIG. 11, the following problems can be conceived. An example of travel drive performance requested on the wheel loader is shown in FIG. 12. The wheel loader generally performs a work of carrying soil etc. and an excavation work of digging natural ground while the wheel loader travels with its four wheels. Accordingly, the wheel loader requires a large driving force at stoppage or extremely low speed. In addition, the wheel loader travels at high speed up to a vehicle speed of about 30 to 40 km/h. Thus, as shown in FIG. 12, the wheel loader is largely different from an operation range requested on a general industrial electric motor and is requested to have travel drive performance in a wide operation range. When it is intended to achieve such travel drive performance in the hybrid system in which the wheel loader can travel with a single drive motor 9 as shown in FIG. 11, both the driving with high torque at a low speed and the driving in a high speed rotation range have to be covered only by the drive motor 9. Accordingly, the electric motor is required to have a capacity about twice as large as the requested output. When the electric motor has a capacity about twice as large as the performance actually requested, it is conceived that it may be very difficult to mount the electric motor on the vehicle.

Therefore, in order to solve the aforementioned problem, it is an effective means that the electric motor for travel drive is split into plural pieces and the pieces are mounted. As a technique concerned with a work machine using two electric motors, for example, Patent Literature 1 has given disclosure about a travel work machine including a traveling body and a work device, characterized in that: the travel work machine further includes: a first electric motor; a second electric motor; and a torque distributing and transmitting mechanism into which drive torques of the first and second electric motors are inputted and which distributes and transmits the drive torques of the first and second electric motors to a drive shaft of the traveling body and a drive shaft of the work device. According to this, there is the following description. That is, the total of the capacities of the electric motors is reduced and configuration and control contents for allocating these drive powers of the electric motors to the respective drive shafts are made simple when the traveling body and the work device of the travel work machine are operated with the electric motors used as drive sources. In this manner, device cost can be reduced and energy efficiency can be improved.

CITATION LIST

Patent Literature

Patent Literature 1: JP-A-2006-205777

SUMMARY OF INVENTION

Technical Problem

Motive power for the work hydraulic pump and motive power for the travel portion are distributed between the two electric motors during operation of the travel work machine described in the aforementioned technique. Accordingly, it is necessary to make control to repeat distribution of the motive powers at anytime in accordance with an operation mode of the machine. Control contents for achieving the control will be considerably complicated. Further, when this travel work machine is a hybrid machine in which a generator is driven by motive power of an engine and electric motors are driven by electric power generated by the generator, there is a possibility that transmission efficiency will be lower than in the background-art work machine.

Therefore, an object of the invention is to provide a hybrid work vehicle which is a wheel type work vehicle performing work with a front hydraulic work device while traveling with four tires like a wheel loader, and which is simple in configuration, good in ease of mounting on a vehicle and capable of efficiently transmitting motive power.

Solution to Problem

In order to achieve the foregoing object, the invention provides a hybrid work vehicle (e.g. an articulated wheel loader or an articulated dump truck) including: an engine; a hydraulic pump which is driven by the engine; a work device which is disposed in the front of the vehicle and performs work using the hydraulic pump as a drive source; a motor/generator which generates electric power by use of torque of the engine; and a travel drive device which causes the vehicle to travel by rotating and driving wheels by use of the electric power generated by the motor/generator, the hybrid work vehicle being steered while the vehicle bends by way of a center joint, characterized in that: the travel drive device has a plurality of electric motors, and a propeller shaft which is linked with the plurality of electric motors and transmits motive power from the plurality of electric motors to the wheels; and the plurality of electric motors are disposed at the front and rear sides of the center joint with the center joint being disposed therebetween.

According to the invention, a wide range of travel drive performance required by the work vehicle can be covered by the plurality of electric motors. Accordingly, the size of each of the electric motors can be reduced so that the electric motors can be mounted on the vehicle easily in comparison with the case where the wide range of travel drive performance is covered by a single electric motor. Further, according to the invention, the plurality of electric motors are disposed at the front and rear sides of the center joint with the center joint being disposed therebetween so that balance of the weight of the vehicle is good, in comparison with the case where the plurality of electric motors are disposed collectively at one of opposite sides with the center joint being disposed between the opposite sides. Therefore, design change for the purpose of mounting the electric motors on the vehicle is not necessary. More specifically, according to the invention, the plurality of electric motors may be mounted separately in empty spaces at the front and rear sides of the center joint of the background-art work vehicle. According to the invention, the plurality of electric motors are used as motive sources so that it is a matter of course that the motive power can be transmitted efficiently, in comparison with the background-art work vehicle in which only the engine is used as the motive power source.

In addition, according to the invention, there is provided a hybrid work vehicle having the aforementioned configuration, characterized in that: the plurality of electric motors include a high-speed type electric motor which has such characteristic that the electric motor can output torque in a range of from a low speed region to a high speed region, and a low-speed type electric motor which has such characteristic that the electric motor has larger torque in the low speed region and smaller torque in the high speed region than the high-speed type electric motor; and the low-speed type electric motor is disposed at the rear side of the center joint and the high-speed type electric motor is disposed at the front side of the center joint.

Of the high-speed type electric motor and the low-speed type electric motor having the aforementioned characteristics, the low-speed type electric motor is generally large in size. It is general that a work vehicle provided with a work device in the front of the vehicle has a counter weight provided for making balance of the vehicle. In the invention, the high-speed type electric motor is disposed at the front side of the center joint while the slow-speed type electric motor larger than the high-speed type electric motor is disposed at the rear side thereof. Accordingly, the invention has an advantage that the weight of the low-speed type electric motor can be used as part of the counter weight.

The high-speed type electric motor in the invention has such characteristic that the electric motor can output torque in a range of from the low speed region to the high speed region. In other words, the high-speed type electric motor has travel drive performance requested mainly for high speed travelling of the vehicle. In addition, the low-speed type electric motor in the invention has such characteristic that the electric motor has larger torque in the low speed region and smaller torque in the high speed region than the high-speed type electric motor. In other words, the low-speed type electric motor has travel drive performance requested mainly during work performed by the work device.

In addition, according to the invention, there is provided a hybrid work vehicle in the aforementioned configuration, characterized in that: the travel drive device determines the torques of the plurality of electric motors based on a travel output request value from the vehicle and respective efficiency tables of the plurality of electric motors so as to gain characteristic in which the total efficiency of the plurality of electric motors comes close to highest efficiency. According to the invention, motive power can be transmitted more efficiently under easy control.

In addition, according to the invention, there is provided a hybrid work vehicle in the aforementioned configuration, characterized in that: a permanent magnet synchronous motor is used as the low-speed type electric motor, and an output shaft of the permanent magnet synchronous motor is linked with the propeller shaft through a clutch; and the clutch is disengaged so as to mechanically cut off the output shaft of the permanent magnet synchronous motor from the propeller shaft in the high speed region in which the permanent magnet synchronous motor comes into a dragged rotation state. According to the invention, dragged rotation can be avoided so that occurrence of extra loss during high speed travelling can be reduced.

In addition, according to the invention, there is provided a hybrid work vehicle in the aforementioned configuration, characterized in that: the low-speed type electric motor is formed to have a configuration in which a reducer formed to have a predetermined gear ratio is combined with the high-speed type electric motor. According to the invention, the size of the low-speed type electric motor can be reduced.

In addition, according to the invention, there is provided a hybrid work vehicle in the aforementioned configuration, characterized in that: the motor/generator is disposed in front of the engine and coaxially with the engine; and the electric motor disposed at the rear side of the center joint is disposed on a lower side of the motor/generator. According to the invention, a space where the torque converter and the transmission are provided in the background-art work vehicle only using drive of the engine can be used directly so that the motor/generator and the electric motor can be disposed in that space. It is therefore unnecessary to change design for the purpose of placing these devices. Thus, the devices can be mounted on the vehicle more easily.

Advantageous Effects of Invention

According to the invention, it is possible to provide a hybrid work vehicle which is a work vehicle such as a wheel loader or a dump truck performing work with a front hydraulic work device while traveling with four tires, and which is simple in configuration, good in ease of mounting on a vehicle and capable of efficiently transmitting motive power.

DESCRIPTION OF EMBODIMENTS

Figure 1:
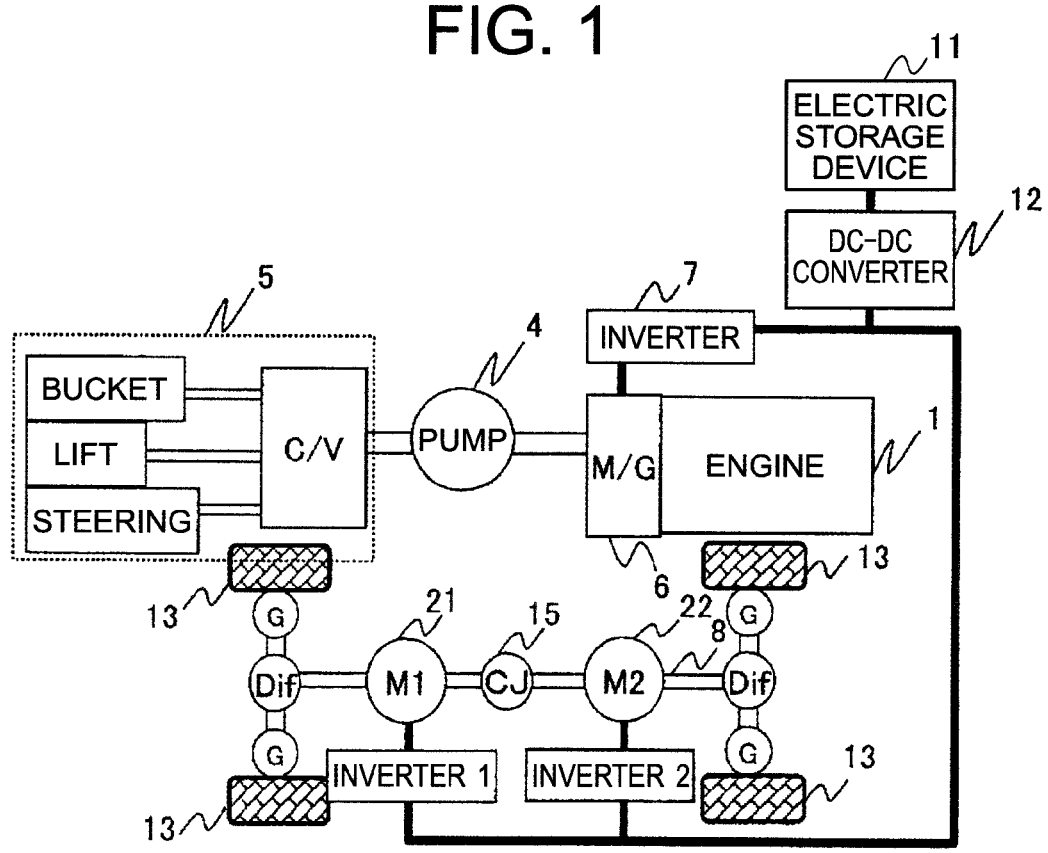
FIG. 1 A view showing a hybrid system of a wheel loader which uses two drive motors, as an example of the invention.

A hybrid wheel loader will be described below as an embodiment of a hybrid work vehicle according to the invention by way of example. First, a configuration of a hybrid wheel loader provided with two drive motors (electric motors) 21 and 22 is shown in FIG. 1. The wheel loader shown in FIG. 1 is a series hybrid type wheel loader which is configured in such a manner that an engine 1 is driven to rotate the drive motors 21 and 22 by use of electric power generated by a motor/generator 6 so that four wheels 13 are driven to rotate by the rotation of the drive motors 21 and 22 to thereby cause the vehicle to travel. Specifically, in the hybrid system shown in FIG. 1, a travel drive device is formed by the drive motors 21 and 22 disposed on a propeller shaft 8 or in the vicinity of the propeller shaft 8. When the drive motors 21 and 22 rotate, motive powers of the drive motors 21 and 22 are transmitted to the propeller shaft 8 so that the wheels 13 are driven to rotate through differential gears (Dif) and gears (G).

Figure 13:
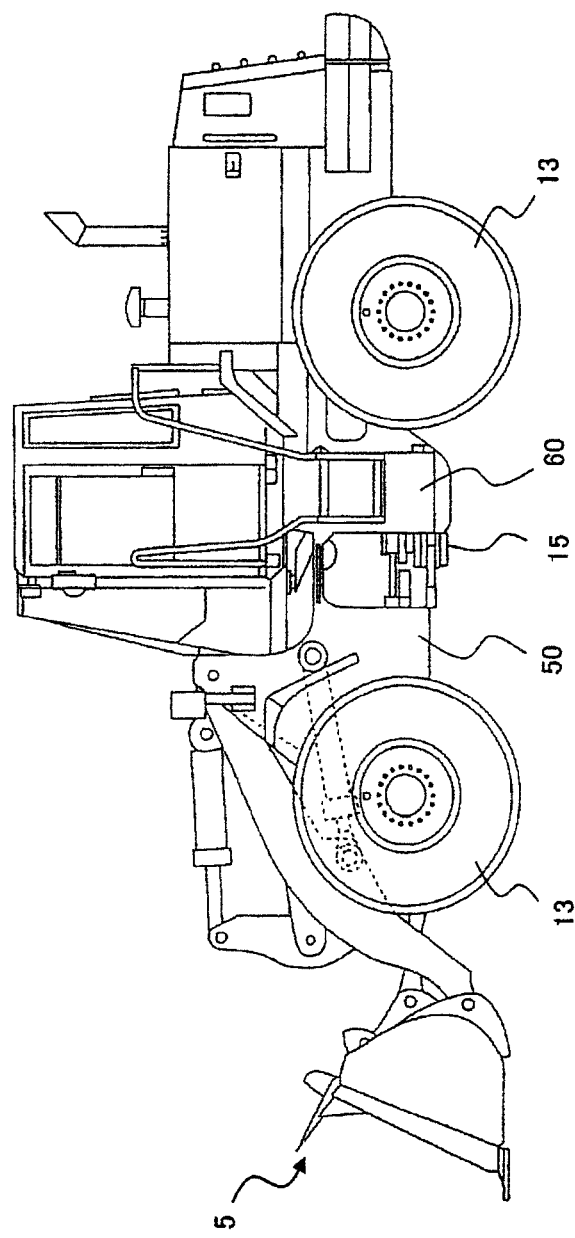
FIG. 13 A side view of a wheel loader according to an example of the invention.

Further, the wheel loader according to this example is an articulated vehicle which can be steered while the vehicle bends at the center of the vehicle and in which a center joint (CJ) 15 is built in the bending center portion of the propeller shaft 8 (FIG. 1), and a front frame 50 is provided in a front side of the center joint 15 while a rear frame 60 is provided in a rear side of the center joint 15 (see FIG. 13). An electric motor (M1) 21 and an electric motor (M2) 22 are disposed as drive motors at the front and rear sides of the propeller shaft 8 respectively while the center joint 15 is interposed between the electric motor (M1) 21 and the electric motor (M2) 22. For example, the electric motor (M1) 21 mounted on the front side of a vehicle body is provided in the front frame 50 side having room in the layout and the electric motor (M2) 22 mounted on the rear side of the vehicle body is provided in the rear frame 60 side. In the case where the drive motors 21 and 22 are disposed on the propeller shaft 8, the drive motors 21 and 22 having hollow structures may be used so that the propeller shaft 8 can be inserted into the hollow portions of the drive motors 21 and 22 to thereby link the drive motors with the propeller shaft. In the case where the drive motors 21 and 22 are disposed in the vicinity of the propeller shaft 8, shafts of the drive motors 21 and 22 may be linked with the propeller shaft 8 by means of gears etc.

When the engine 1 is driven, a hydraulic pump 4 is actuated so that pressure oil is supplied from the hydraulic pump 4 to the hydraulic work device (work device) 5. The pressure oil supplied to the hydraulic work device 5 is supplied to a bucket, a lift and a steering through a control valve (C/V). When an operator operates an operating lever etc. from a not-shown operator's cab, the bucket, the lift and the steering can perform predetermined operation.

In this manner, the hybrid wheel loader shown in FIG. 1 is driven by motive power which is requested by the vehicle and which is assigned to the drive motors 21 and 22 whose output shafts are mechanically connected. Accordingly, each of the drive motors 21 and 22 can be formed as an electric motor with a smaller capacity than in the case where the drive motors 21 and 22 are formed into a single electric motor. As a result, in comparison with the case where the drive motors 21 and 22 are formed into a single drive motor, the size of the electric motor (M2) 22 provided in the rear frame 60 side can be formed to be smaller so as to improve the ease of mounting on the vehicle (the degree of freedom of layout). Here, when the two drive motors 21 and 22 are formed as electric motors with the same specifications, each of the two electric motors 21 and 22 which are mechanically connected to each other by the propeller shaft 8 as shown in FIG. 1 may output half the motive power requested by the vehicle.

Figure 3:
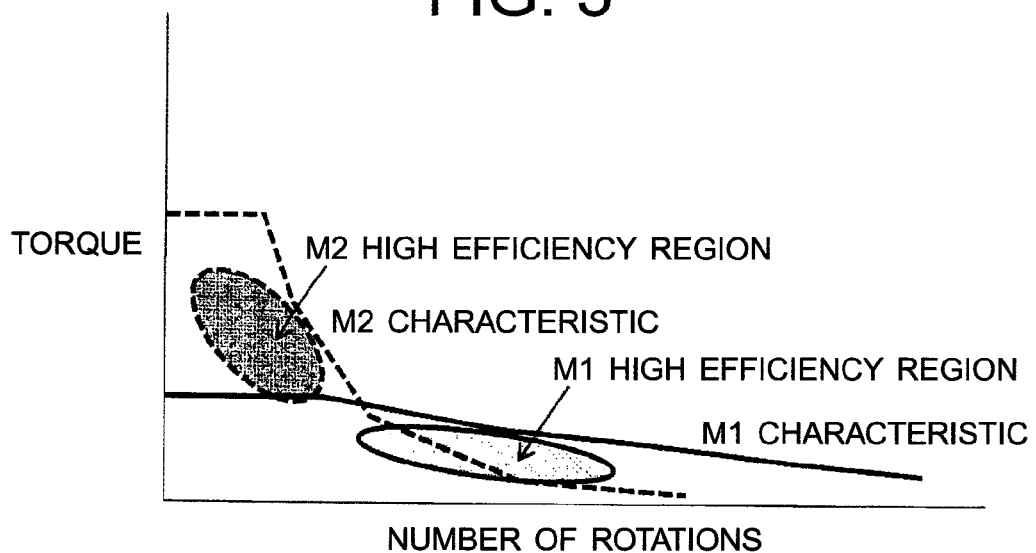
FIG. 3 A graph showing N-T characteristic of the two drive motors of the high-speed and low-speed types.

Further, when the two drive motors are formed as electric motors having different drive characteristics as shown in FIG. 3, the capacity of each of the drive motors can be formed optimally so as to be able to generate torque with highest motor efficiency in response to the motive power requested for travelling by the vehicle. For example, the drive motor 21 in front of the center joint 15 is set as a high-speed type electric motor which has such characteristic that the electric motor cannot generate large torque in a low speed region but can be driven up to high speed rotation (M1 characteristic, the solid line in FIG. 3) as shown in N-T characteristic of FIG. 3. On the other hand, the drive motor 22 at the rear of the center joint 15 is set as a low-speed type electric motor which has such characteristic that the electric motor cannot generate torque up to high speed rotation but can generate large torque in a low speed region (M2 characteristic, the broken line in FIG. 3) as shown in the N-T characteristic of FIG. 3 likewise. When the drive motors 21 and 22 are set thus, the electric motors having different characteristics have different operation regions in which the electric motors can be driven with high efficiencies, as shown in FIG. 3. Accordingly, high efficiency motor drive can be achieved in a wide range of power performance requested by the vehicle.

Figure 2:
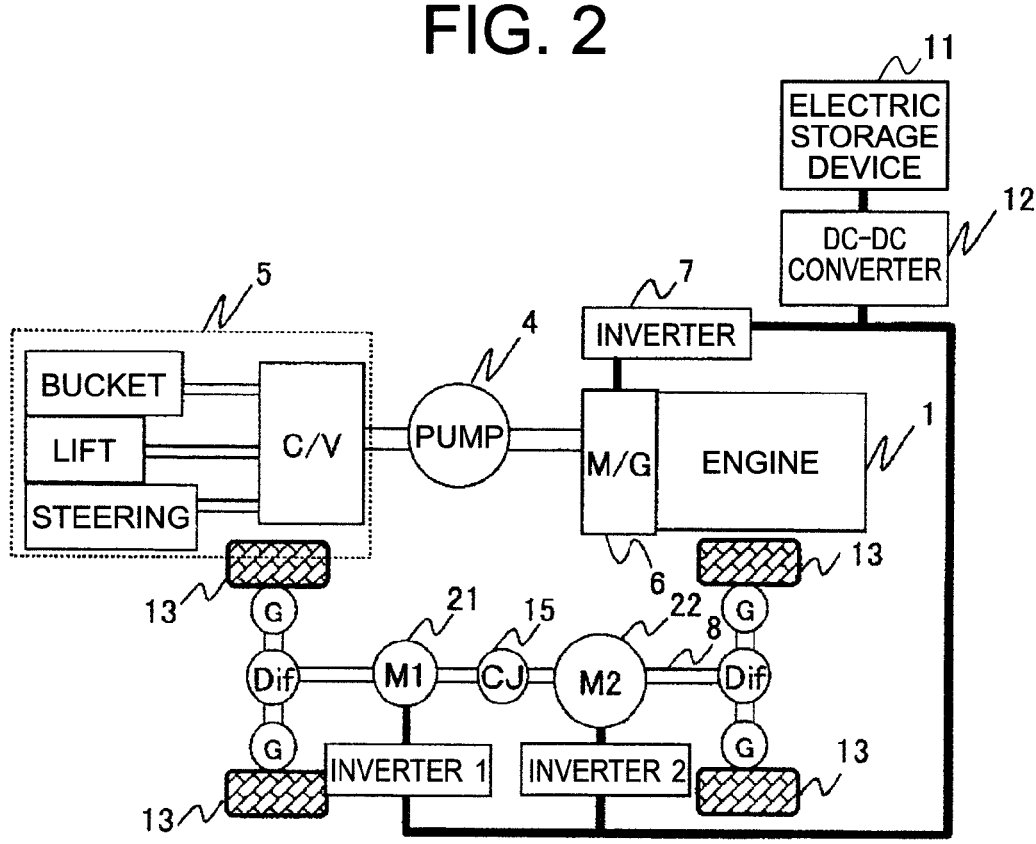
FIG. 2 A view showing a hybrid configuration of a wheel loader using two drive motors one of which is a high-speed type and the other of which is a low-speed type, as an example of the invention.

A configuration example of a hybrid wheel loader mounted with two electric motors with different characteristics is shown in FIG. 2. The drive motor 21 is a high-speed type electric motor. The drive motor 22 is a low-speed type electric motor. The drive motor 22 is larger in size than the drive motor 21. In order to depict this, the circle representing the drive motor 22 is larger than the circle representing the drive motor 21 in FIG. 2.

Figure 4:
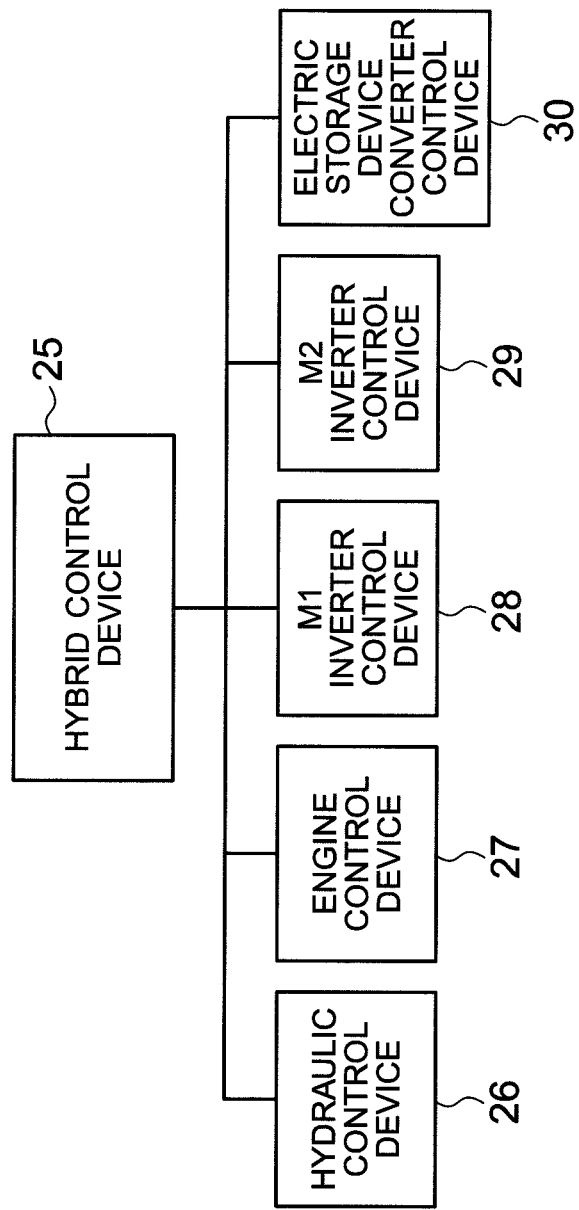
FIG. 4 A view showing a controller configuration of a hybrid wheel loader.

An example of a method of determining the torque of each drive motor in the aforementioned hybrid system including two drive motors will be shown here. FIG. 4 shows a configuration example of a controller for controlling the hybrid wheel loader. The controller in FIG. 4 is built in the travel drive device. This controller is provided with a hybrid control device 25 which manages energy of the whole vehicle. The hybrid control device 25 determines the output with which each component is driven. Each of control devices (26 to 30) in FIG. 4 controls a corresponding component in accordance with a command value concerned with the output and issued from the hybrid control device 25. The method of determining the torque of each drive motor of the hybrid system shown in FIG. 2 based on the configuration of such a controller is shown in FIG. 5.

Figure 5:
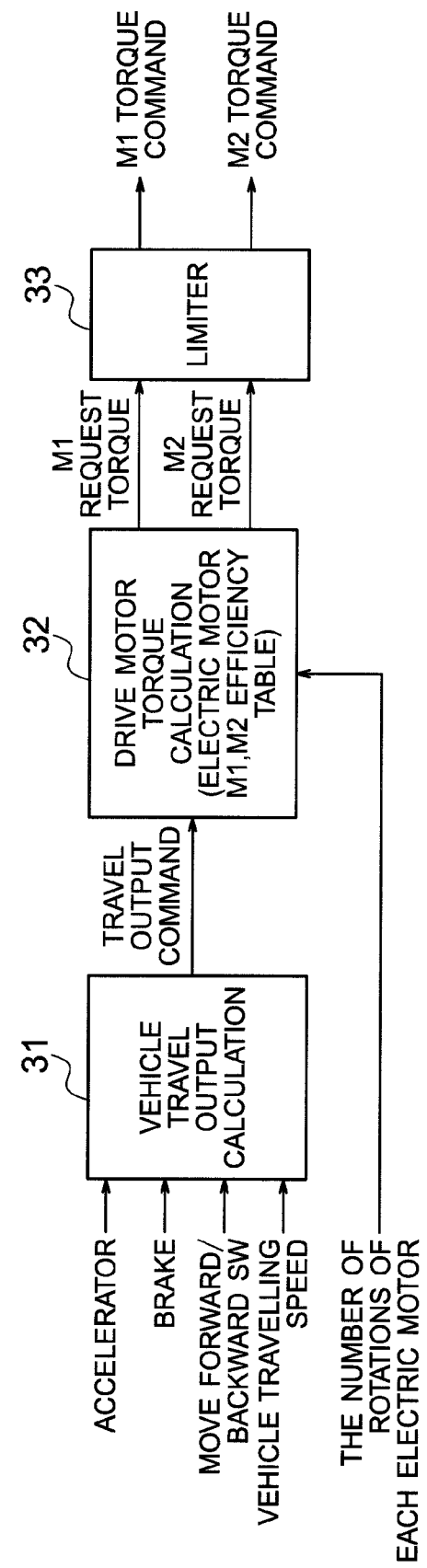
FIG. 5 A view showing a block diagram of a portion which determines torques of the drive motors.

In the method of determining the torque of each drive motor as shown in FIG. 5, first, an accelerator signal, a brake signal, a move forward/backward SW signal and a current vehicle travelling speed or the like corresponding to an operation command from an operator are inputted and a travel output command requested by the vehicle is calculated in a vehicle travel output calculator 31. Although the state quantity calculated here is described as output (power), the state quantity may be changed to a state quantity of torque and then calculated because the travelling speed of the vehicle (the number of rotations of each electric motor) can be generally detected. Further, in accordance with the calculated travel output command, requested torques of the drive motor (M1) 21 and the drive motor (M2) 22 are calculated in a drive motor torque calculator 32. On this occasion, the sum of the requested torques of the drive motor (M1) 21 and the drive motor (M2) 22 is a torque value corresponding to the aforementioned travel output command requested by the vehicle.

An efficiency data table for the drive motor (M1) 21 and the drive motor (M2) 22 is provided internally in the drive motor torque calculator 32. Assignment of torques capable of achieving the highest motor efficiency in response to the travelling output command is determined based on the efficiency data table. When torque commands are finally outputted to an inverter control device 28 for the drive motor (M1) 21 and an inverter control device 29 for the drive motor (M2) 22, the torque commands are subjected to torque limit processing based on restrictions of the hybrid system and the vehicle by a limiter 33 to be thereby set as an M1 torque command and an M2 torque command respectively. The M1 and M2 inverter control devices 28 and 29 drive the drive motor (M1) 21 and the drive motor (M2) 22 based on the aforementioned M1 torque command and the aforementioned M2 torque command so as to perform a vehicle travelling operation.

As described above, in the example, the two drive motors 21 and 22 with different characteristics are used in assignment of the torques in response to the vehicle request so that the electric motors can have the highest efficiencies. Accordingly, each of the drive motors can be set to have an optimal capacity and reduction in the size of the drive device and increase in the efficiency of the drive device can be achieved.

Since the two electric motors having different characteristics are used in the aforementioned case, it is conceived that the electric motor generating large torque on the low speed side is heavier than the other high-speed type electric motor. On the other hand, in a general construction machine vehicle, due to various works such as conveyance of heavy matters performed by the hydraulic work device (work device) 5 such as the bucket provided in the front of the vehicle, a counter weight for making balance is mounted at the rear of the vehicle. Accordingly, in the configuration of the hybrid system shown in FIG. 2, it is preferable that the electric motor which generates large torque on the low speed side and which is heavy is mounted on the opposite side to the hydraulic work device 5, i.e. at the rear of the vehicle. Particularly because the center joint 15 by way of which the vehicle bends due to a steering operation is on the propeller shaft 8, the drive motor 22 generating large torque on the low speed side is mounted at the rear side of the center joint 15.

Figure 6:
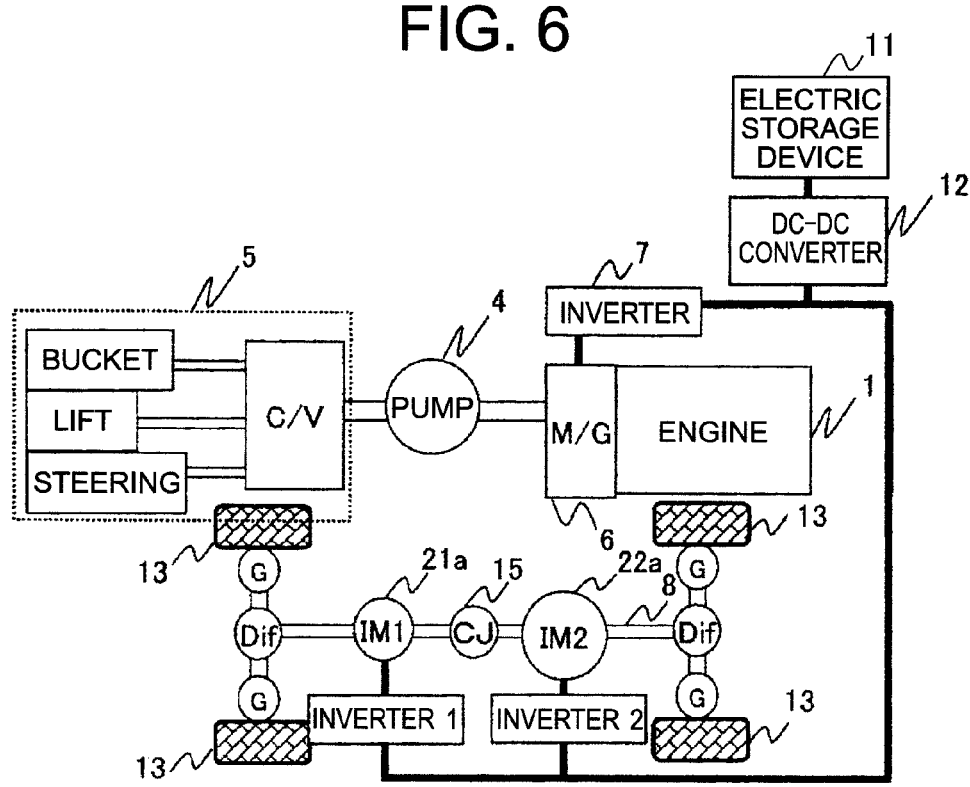
FIG. 6 A view showing a hybrid configuration of a wheel loader in which two induction motors one of which is a high-speed type and the other of which is a low-speed type are used as the drive motors, as an example of the invention.

Although the aforementioned two drive motors are not limited to particular types, both two drive motors 21a and 22a may be formed as induction motors, for example, as shown in FIG. 6. Also in this case, the high-speed type induction motor (IM1) 21a is placed in the front side of the center joint 15 while the low-speed type induction motor (IM2) 22 is placed in the rear side of the center joint 15. On this occasion, the efficiency characteristic of the drive motor 21a is regarded as M1 characteristic shown in FIG. 3 and the efficiency characteristic of the drive motor 22a is regarded as M2 characteristic shown in FIG. 3. In the case of high-speed traveling in the hybrid system shown in FIG. 6, the low-speed type induction motor (IM2) 22a operates in dragged rotation. Since the reference sign 22a represents an induction motor, the operation of dragged rotation can be made small in loss by a method of stopping magnetization of the electric motor. Based on the aforementioned description, it can be said that an induction motor is preferably used as the drive motor mounted on the hybrid wheel loader in view of simple control and small loss in high speed travelling.

Figure 7:
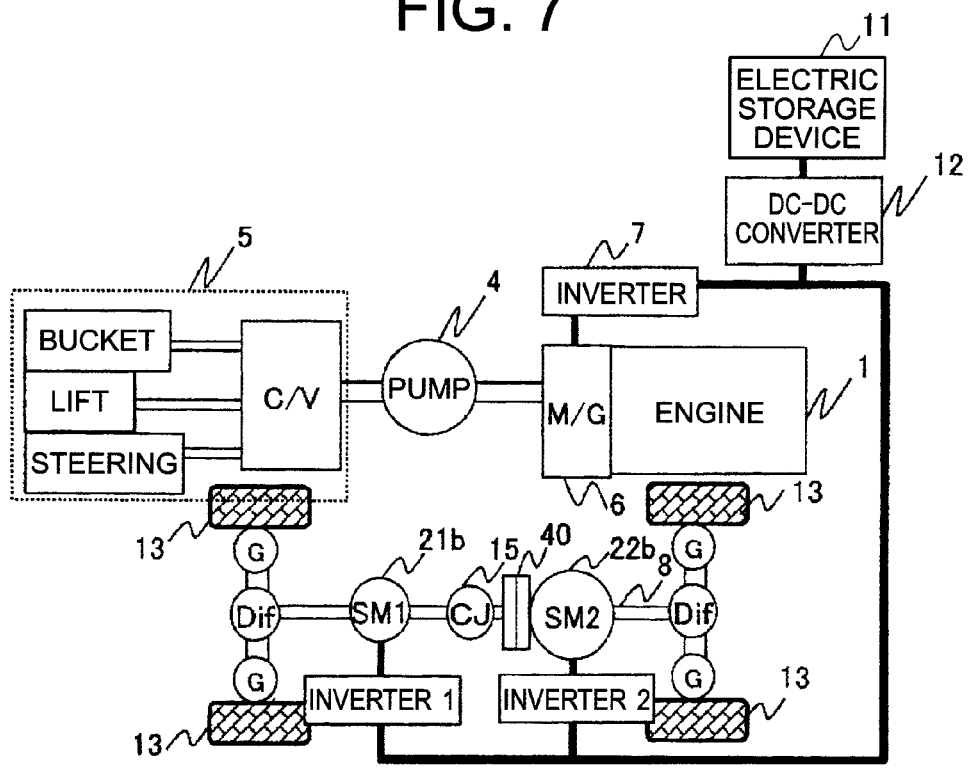
FIG. 7 A view showing a hybrid configuration of a wheel loader in which two permanent magnet synchronous motors one of which is a high-speed type and the other of which is a low-speed type are used for travelling, as an example of the invention.

Generally, an induction motor has a comparatively large frame compared with its output. Therefore, there is recently a tendency that a permanent magnet synchronous motor is used in place of the induction motor. Also in the example, permanent magnet synchronous motors may be used to form a hybrid system. The hybrid configuration in the case where the permanent magnet synchronous motors are used is shown in FIG. 7. Also in the example, a high-speed type synchronous motor (SM1) 21b is disposed in front of the center joint 15 while a low-speed type synchronous motor (SM2) 22b is disposed at the rear of the center joint 15. On this occasion, the efficiency characteristic of the drive motor 21b is regarded as M1 characteristic shown in FIG. 3 and the efficiency characteristic of the drive motor 22b is regarded as M2 characteristic shown in FIG. 3. In the case where the drive motors are set thus as the permanent magnet synchronous motors, the size of each of the drive motors can be reduced in comparison with the case where induction motors are mounted.

However, when the permanent magnet synchronous motors are used as the drive motors, due to permanent magnets provided in the electric motors, a weak field current for suppressing occurrence of an induced voltage generated by the permanent magnets has to be applied during high-speed travelling. It is therefore conceived that the low-speed type synchronous motor (SM2) 22b causes loss due to the dragged rotation thereof during the high-speed traveling operation. In order to suppress such extra loss, as shown in FIG. 7, a clutch 40 is provided between the low-speed type synchronous motor 22b and the propeller shaft 8 so that the clutch 40 can be disengaged in response to the dragged rotation during the high speed travelling. Then, connection between the output shaft of the low-speed type synchronous motor 22b and the propeller shaft 8 is cut off mechanically. In this manner, operation can be continued without occurrence of any extra loss during the high speed travelling also in the configuration of the hybrid wheel loader shown in FIG. 7.

Figure 8:
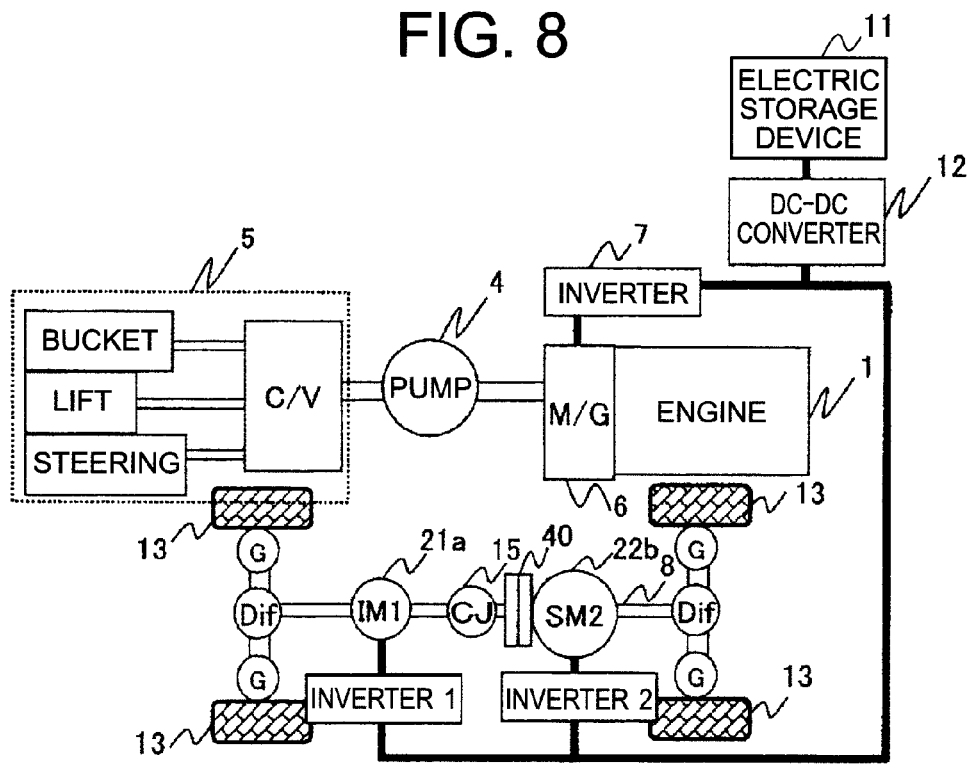
FIG. 8 A view showing a hybrid configuration of a wheel loader in which a high-speed type induction motor and a low-speed type permanent magnet synchronous motor are used for travelling, as an example of the invention.

The clutch 40 shown in FIG. 7 only disengages transmission of the output shaft of the drive motor 22b so that the vehicle is formed to have a four-wheel drive configuration in the state that an axel of the vehicle itself remains in connection. Although description is made that electric motors of the same type are used as the two drive motors in each of the hybrid configuration of FIG. 6 and the hybrid configuration of FIG. 7, an induction motor and a permanent magnet synchronous motor may be used together. As described above, usually, the induction motor is small in loss in a high speed region, and the permanent magnet synchronous motor can generate large torque efficiently in a low speed region. Accordingly, the configuration in which the high-speed type electric motor located in the front side of the vehicle is formed as the induction motor (IM1) 21a and the low-speed type electric motor located in the rear side of the vehicle is formed as the synchronous motor (SM2) 22b is realistic. The hybrid configuration is shown in FIG. 8.

Figure 9:
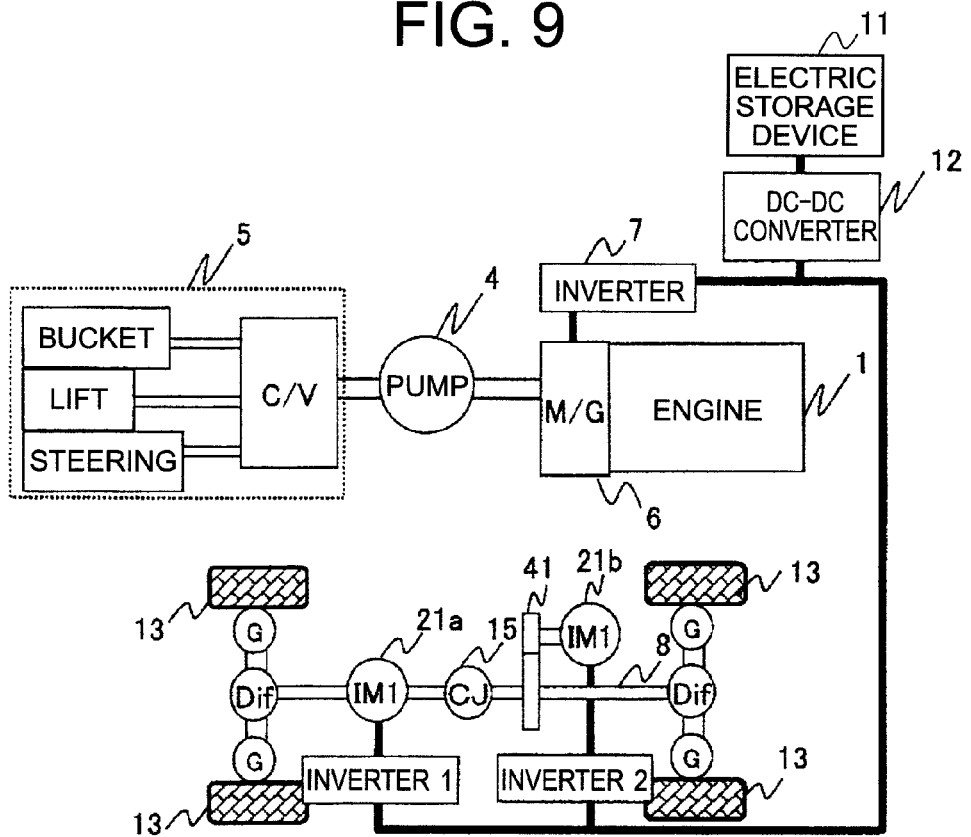
FIG. 9 A view showing a hybrid configuration of a wheel loader in which two high-speed type induction motors are used for travelling, as an example of the invention.

As another example, an example in which two electric motors are formed as electric motors having the same characteristic will be described below. The configuration is shown in FIG. 9. In the hybrid system in the example, the high-speed type induction motor (IM1) 21a, 21b is disposed in each of a front portion of the vehicle and a rear portion of the vehicle. In the case where the two drive motors are formed thus as electric motors having the same characteristic, the high-speed type induction motor (IM1) 21b located in the rear portion of the vehicle is connected to the propeller shaft 8 through a reducer 41, as shown in FIG. 9. Although the high-speed type induction motor (IM1) 21b can generate torque in the high speed region in the background art, the reducer 41 can be used to generate large torque in the low speed region so that the torque transmitted to the propeller shaft 8 is increased. When the reducer 41 is used thus, electric motors having the same characteristic can be used as the two drive motors. In this manner, the size of the low-speed type electric motor usually tending to increase can be reduced.

The method of determining the torque of each drive motor in the example can be achieved in the aforementioned control configuration of FIG. 5. In this case, the number of rotations of the drive motor in the rear portion of the vehicle is set higher correspondingly to the change gear ratio of the reducer 41. Accordingly, it is necessary to input both the number of rotations of the drive motor in the front portion of the vehicle and the real number of rotations of the drive motor in the rear portion of the vehicle into the drive motor torque calculator 32 in FIG. 5.

Figure 10:
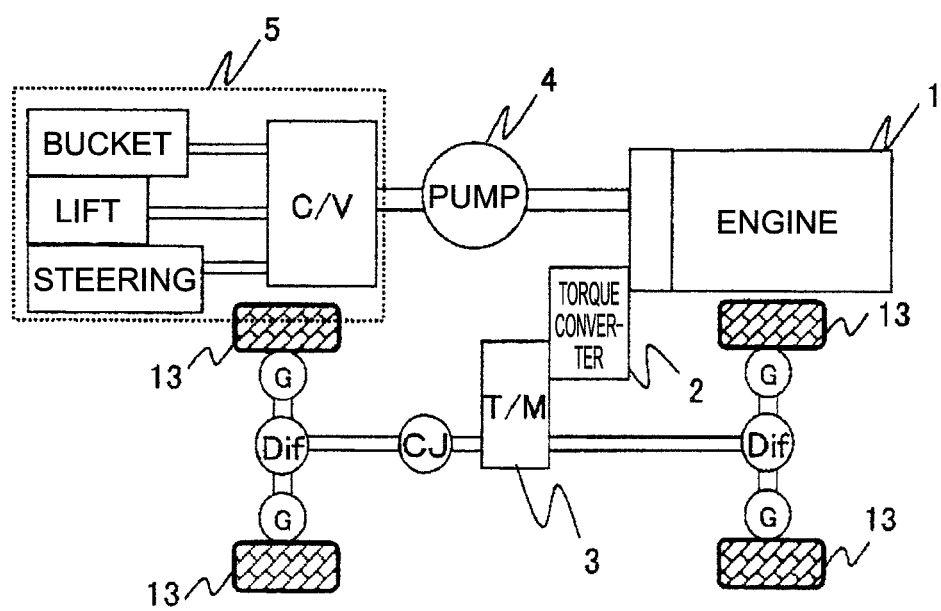
FIG. 10 A view showing a configuration of a drive system of a torque converter type wheel loader according to the background art.
Figure 11:
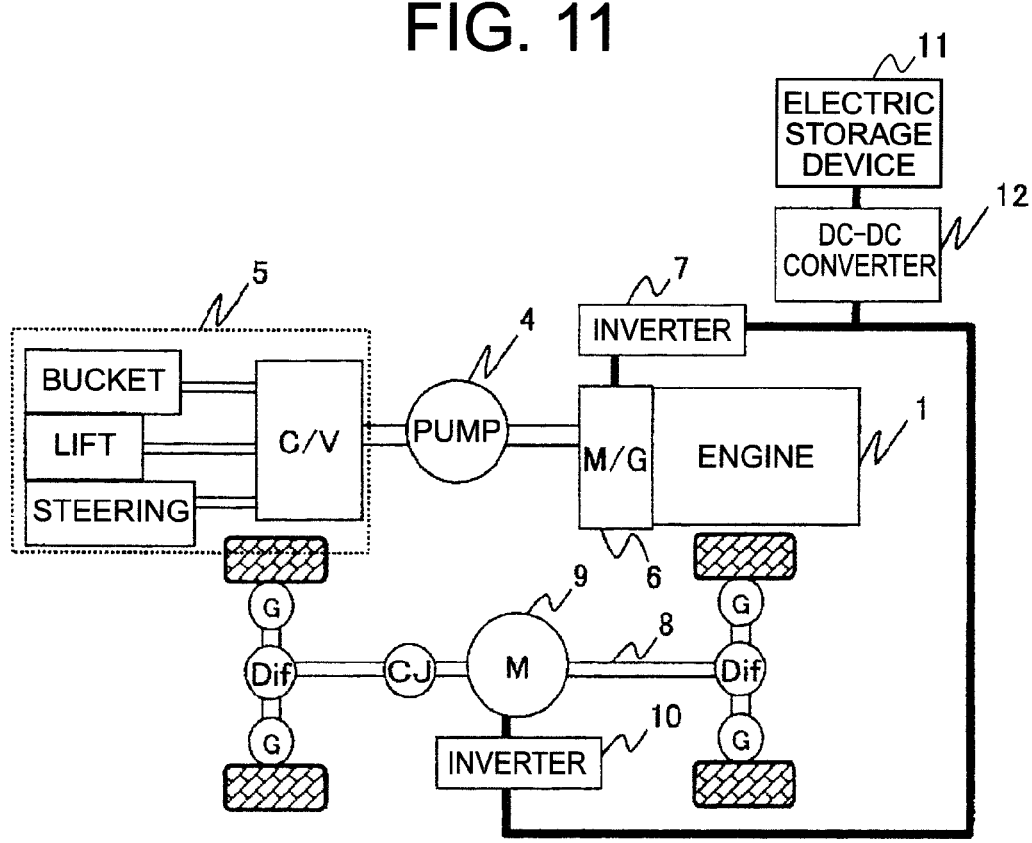
FIG. 11 A view showing a configuration example of a travel series type hybrid drive device.
Figure 12:
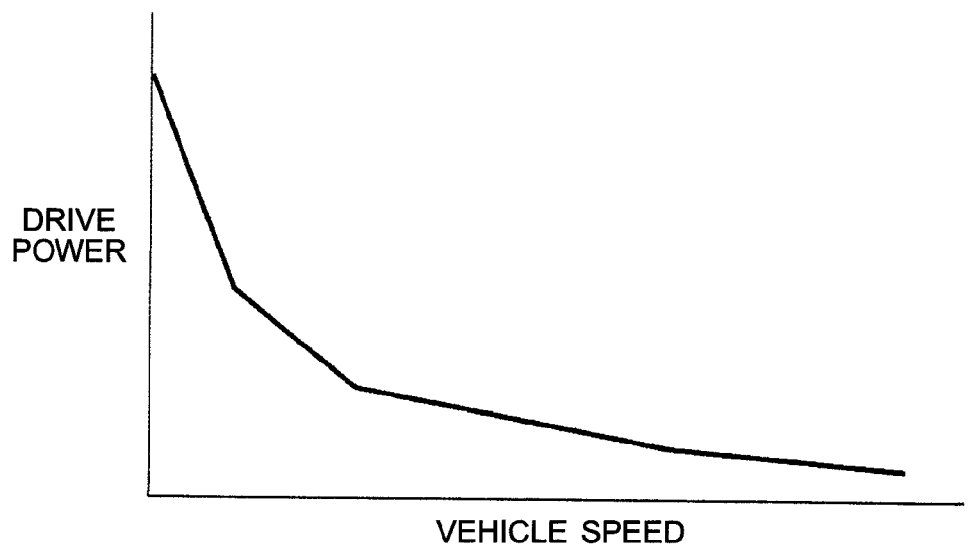
FIG. 12 A view showing a travel performance example of a wheel loader.

The motor/generator (M/G) 6 as a constituent of the hybrid system described in the aforementioned example can be disposed coaxially with the engine 1 corresponding to the position of the torque converter 2 of the background-art torque converter drive vehicle (see FIG. 10). Further, the drive motor in the rear side of the vehicle can be mounted in the direction of the lower portion of the motor/generator (M/G) 6, i.e. in the position of the transmission 3 of the torque converter drive vehicle (see FIG. 10). Thus, electric components necessary for the hybrid system can be disposed properly. It is a matter of course that the configuration of the aforementioned example can be applied to a hybrid dump truck.

REFERENCE SIGNS LIST

1 ... engine, 2 ... torque converter, 3 ... transmission (T/M), 4 ... hydraulic pump, 5 ... hydraulic work device (work device), 6 ... motor/generator (M/G), 7 ... inverter, 8 ... propeller shaft, 9 ... drive motor, 10 ... inverter, 11 ... electric storage device, 12 ... DC-DC converter, 13 ... wheel, 15 ... center joint (CJ), 21, 21a, 21b ... drive motor (electric motor), 22, 22a, 22b ... drive motor (electric motor), 25 ... hybrid control device, 28 ... M1 inverter control device, 29 ... M2 inverter control device, 31 ... vehicle travel output calculator, 32 ... drive motor torque calculator, 33 ... limiter, 40 ... clutch, 41 ... reducer

The invention claimed is:

1. A hybrid work vehicle comprising:
an engine;
a hydraulic pump which is driven by the engine;
a work device which is disposed in the front of the vehicle and performs work using the hydraulic pump as a drive source;
a motor/generator which generates electric power by use of torque of the engine;
a center joint at which the hybrid work vehicle bends while being steered; and
a travel drive device which causes the vehicle to travel by rotating and driving wheels on a front side of the hybrid work vehicle and wheels on a rear side of the hybrid work vehicle by use of the electric power generated by the motor/generator,
the travel drive device comprising a plurality of electric motors, and a propeller shaft which is linked with the plurality of electric motors and transmits motive power from the plurality of electric motors to the wheels; wherein:
the wheels on the front side of the hybrid work vehicle are connected to the propeller shaft via a front side differential gear;
the wheels on the rear side of the hybrid work vehicle are connected to the propeller shaft via a rear side differential gear;
at least one of
the plurality of electric motors is disposed on a front side of the center joint and at least one of the plurality of electric motors is disposed on a rear side of the center joint with the center joint being disposed between the at least one of the plurality of electric motors disposed on the front side of the center joint and the at least one of the plurality of electric motors disposed on a rear side of the center joint;
the at least one of the plurality of electric motors disposed on the front side of the center joint is linked with the propeller shaft at a position between the front side differential gear and the center joint; and
the at least one of the plurality of electric motors disposed on a rear side of the center joint is linked with the propeller shaft at a position between the rear side differential gear and the center joint.

2. A hybrid work vehicle according to claim 1, wherein:
the plurality of electric motors include a high-speed type electric motor which has such characteristic that the electric motor can output torque in a range of from a low speed region to a high speed region, and a low-speed type electric motor which has such characteristic that the electric motor has larger torque in the low speed region and smaller torque in the high speed region than the high-speed type electric motor; and
the low-speed type electric motor is disposed at the rear side of the center joint and the high-speed type electric motor is disposed at the front side of the center joint.

3. A hybrid work vehicle according to claim 2, wherein:
the travel drive device determines the torques of the plurality of electric motors based on a travel output request value from the vehicle and respective efficiency tables of the plurality of electric motors so as to gain characteristic in which the total efficiency of the plurality of electric motors comes close to highest efficiency.

4. A hybrid work vehicle according to claim 3, wherein:
a permanent magnet synchronous motor is used as the low-speed type electric motor, and an output shaft of the permanent magnet synchronous motor is linked with the propeller shaft through a clutch; and
the clutch is disengaged so as to mechanically cut off the output shaft of the permanent magnet synchronous motor from the propeller shaft in the high speed region in which the permanent magnet synchronous motor comes into a dragged rotation state.

5. A hybrid work vehicle according to claim 4, wherein:
the motor/generator is disposed in front of the engine and coaxially with the engine; and
the electric motor disposed at the rear side of the center joint is disposed on a lower side of the motor/generator.

6. A hybrid work vehicle according to claim 3, wherein:
the motor/generator is disposed in front of the engine and coaxially with the engine; and
the electric motor disposed at the rear side of the center joint is disposed on a lower side of the motor/generator.

7. A hybrid work vehicle according to claim 2, wherein:
a permanent magnet synchronous motor is used as the low-speed type electric motor, and an output shaft of the permanent magnet synchronous motor is linked with the propeller shaft through a clutch; and
the clutch is disengaged so as to mechanically cut off the output shaft of the permanent magnet synchronous motor from the propeller shaft in the high speed region in which the permanent magnet synchronous motor comes into a dragged rotation state.

8. A hybrid work vehicle according to claim 7, wherein:
the motor/generator is disposed in front of the engine and coaxially with the engine; and
the electric motor disposed at the rear side of the center joint is disposed on a lower side of the motor/generator.

9. A hybrid work vehicle according to claim 2, wherein:
the motor/generator is disposed in front of the engine and coaxially with the engine; and
the electric motor disposed at the rear side of the center joint is disposed on a lower side of the motor/generator.

10. A hybrid work vehicle according to claim 1, wherein:
the at least one of the plurality of electric motors disposed on a rear side of the center joint is a high-speed type electric motor and is linked with the propeller shaft by a reducer formed to have a predetermined gear ratio is combined with the high-speed type electric motor; and
the travel drive device determines the torques of the plurality of electric motors based on a travel output request value from the vehicle and respective efficiency tables of the plurality of electric motors so as to gain characteristic in which the total efficiency of the plurality of electric motors comes close to highest efficiency.

11. A hybrid work vehicle according to claim 10, wherein:
the motor/generator is disposed in front of the engine and coaxially with the engine; and
the at least one of the plurality of electric motors disposed at the rear side of the center joint is disposed on a lower side of the motor/generator.

12. A hybrid work vehicle according to claim 1, wherein:
the at least one of the plurality of electric motors disposed on a rear side of the center joint is a high-speed type electric motor and is linked with the propeller shaft by a reducer formed to have a predetermined gear ratio is combined with the high-speed type electric motor.

13. A hybrid work vehicle according to claim 12, wherein:
the motor/generator is disposed in front of the engine and coaxially with the engine; and
the at least one of the plurality of electric motors disposed at the rear side of the center joint is disposed on a lower side of the motor/generator.

14. A hybrid work vehicle according to claim 1, wherein:
the motor/generator is disposed in front of the engine and coaxially with the engine; and
the electric motor disposed at the rear side of the center joint is disposed on a lower side of the motor/generator.

* * * * *